United States Patent
Kobayashi et al.

(10) Patent No.: US 12,399,493 B2
(45) Date of Patent: Aug. 26, 2025

(54) REMOTE ASSISTANCE SYSTEM AND REMOTE ASSISTANCE METHOD

(71) Applicant: TOYOTA JIDOSHA KABUSHIKI KAISHA, Aichi-ken (JP)

(72) Inventors: Hiromitsu Kobayashi, Nagoya (JP); Hiromitsu Urano, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 186 days.

(21) Appl. No.: 18/462,407

(22) Filed: Sep. 7, 2023

(65) Prior Publication Data
US 2024/0094725 A1  Mar. 21, 2024

(30) Foreign Application Priority Data

Sep. 20, 2022 (JP) ................. 2022-149059

(51) Int. Cl.
*G05D 1/00* (2024.01)
*G06V 10/74* (2022.01)
*G06V 20/56* (2022.01)

(52) U.S. Cl.
CPC ......... *G05D 1/0038* (2013.01); *G05D 1/0022* (2013.01); *G06V 10/761* (2022.01); *G06V 20/56* (2022.01)

(58) Field of Classification Search
CPC .. G05D 1/0038; G05D 1/0022; G06V 10/761; G06V 20/56
See application file for complete search history.

(56) References Cited

U.S. PATENT DOCUMENTS

| | | |
|---|---|---|
| 11,215,982 B2 | 1/2022 | Urano et al. |
| 11,325,618 B2 | 5/2022 | Umeda |
| 2019/0137999 A1 | 5/2019 | Taguchi et al. |
| 2020/0209888 A1 | 7/2020 | Sakai et al. |
| 2020/0326702 A1 | 10/2020 | Iwamoto et al. |
| 2021/0041894 A1 | 2/2021 | Urano et al. |
| 2021/0055741 A1 | 2/2021 | Kawanai et al. |
| 2021/0058173 A1 | 2/2021 | Otaki et al. |
| 2021/0072743 A1 | 3/2021 | Otaki et al. |
| 2021/0080943 A1 | 3/2021 | Iwamoto et al. |

FOREIGN PATENT DOCUMENTS

JP  2021-026696 A  2/2021

*Primary Examiner* — Mathew Franklin Gordon
(74) *Attorney, Agent, or Firm* — HAUPTMAN HAM, LLP

(57) ABSTRACT

A remote assistance system according to the present disclosure comprises a memory storing a database and one or more processors. The database manages, for each of a plurality of operators, feature values of a plurality of feature items regarding a last assistance scene. The one or more processors are configured to execute the following first to third processes. The first process is, when a new assistance request is received from s vehicle, specifying one or more index items from the plurality of feature items. The second process is specifying, from the plurality of operators, one or more candidate operators whose the last assistance scene is similar to a current assistance scene based on the feature values of the one or more index items. The third process is selecting an operator to process the new assistance request from the one or more candidate operators.

5 Claims, 9 Drawing Sheets

| CATEGORY | DESCRIPTION |
|---|---|
| Departure Permission at Intersection | Requests confirmation of traffic conditions around an intersection and a decision to begin entering or passing through the intersection. |
| Departure Permission at Bus Stop | Requests confirmation of traffic conditions around a bus stop and a decision to depart from the bus stop. |
| Passing Permission for Crosswalk | Requests confirmation of pedestrians near a crosswalk and a decision to pass through the crosswalk. |
| Overtaking Permission for Obstacle | Requests determination whether or not an obstacle that is obstructing a vehicle's travel is an object that can be overtaken. |
| Lane Departure Traveling Permission | When it is necessary to extend into the other lanes due to a lane blockage, obstacles, etc., Requests confirmation of surrounding traffic conditions and determination whether or not to allow lane departure. |
| Door Open/Close Permission | Requests confirmation of situation near doors inside/outside a vehicle and determination whether or not to open/close the doors. |
| Door Open/Close Alert | When there is a person near doors inside/outside a vehicle at a bus stop, etc., who may interfere with the opening/closing operation of the doors, Requests a decision whether or not to issue an alert by a speaker or the like. |
| Wheelchair Ramp Unfolding Permission | Request confirmation of conditions near doors inside/outside a vehicle and determination whether or not to unfold a wheelchair ramp. |
| Wheelchair Ramp Unfolding Alert | When there is a person near doors inside/outside a vehicle at a bus stop, etc., who may interfere with the unfolding operation of a wheelchair ramp. Requests a decision whether or not to issue an alert by a speaker or the like. |
| Completion Confirmation of Passenger Boarding/Existing | Requests confirmation of situation inside a vehicle and determination whether or not passengers have completed boarding/existing the vehicle. |
| Passenger Status Confirmation at Departure | Requests determination whether or not the state of passengers is in a condition in which it is acceptable to depart a vehicle (e.g., confirm that the passengers are seated). |
| Passenger Alert | When a situation arises during vehicle travel that may interfere with safe operation (e.g., a passenger standing and walking), Requests a decision whether or not to issue an alert by a speaker or the like. |
| Passenger Support | Request support for passengers operating on-board communication devices, etc. |

FIG. 2A

| FEATURE ITEM | DESCRIPTION | POSSIBLE FEATURE VALUE |
|---|---|---|
| Check Target (Attention Direction) | Object or direction to be checked | inside vehicle/near door/trafic outside vehicle, etc. |
| Service Area | Area in which a vehicle operates | area A/area B, etc. |
| Location | Location where a remote assistance request was issued | intersection A/ bus stop B/ point C, etc. |
| Road Shape | Road shape at the point where a remote assistance request was issued | straight/curve/T-junction/crossroad, etc. |
| Vehicle Shape | Shape of a vhicle issuing a remote assistance request | sedan/small bus/medium bus/large bus, etc. |
| Surrounding Object | Information about objects around a vehicle | vehicle/pedestrian/bicycle, etc. |
| Passenger | Information about passengers | number of people, attributes (adult/children/wheelchair user/stroller user/people with large luggage, etc.), location, seating conditions, etc. |

FIG. 2B

| CATEGORY | | Check Target | Service Area | Location | Road Shape | Vehicle Shape | Surrounding Object | Passenger |
|---|---|---|---|---|---|---|---|---|
| | Departure Permission at Intersection | ✓ | ✓ | ✓ | ✓ | | ✓ | |
| | Departure Permission at Bus Stop | ✓ | ✓ | ✓ | ✓ | | ✓ | |
| | Passing Permission for Crosswalk | ✓ | ✓ | ✓ | ✓ | | ✓ | |
| | Overtaking Permission for Obstacle | ✓ | ✓ | ✓ | ✓ | ✓ | ✓ | |
| | Lane Departure Traveling Permission | ✓ | ✓ | ✓ | ✓ | ✓ | ✓ | |
| | Door Open/Close Permission | ✓ | | ✓ | | ✓ | ✓ | ✓ |
| | Door Open/Close Alert | ✓ | | ✓ | | ✓ | ✓ | ✓ |
| | Wheelchair Ramp Unfolding Permission | ✓ | | ✓ | | ✓ | ✓ | ✓ |
| | Wheelchair Ramp Unfolding Alert | ✓ | | ✓ | | ✓ | ✓ | ✓ |
| | Completion Confirmation of Passenger Boarding/Existing | ✓ | | | | ✓ | | ✓ |
| | Passenger Status Confirmation at Departure | ✓ | | | | ✓ | | ✓ |
| | Passenger Alert | ✓ | | | | ✓ | | ✓ |
| | Passenger Support | ✓ | ✓ | ✓ | | ✓ | | ✓ |

FEATURE ITEM (column group header)

*FIG. 3A*

| CATEGORY | FEATURE ITEM | Check Target | Service Area | Location | Road Shape | Vehicle Shape | Surrounding Object | Passenger |
|---|---|---|---|---|---|---|---|---|
| | Departure Permission at Intersection | 1 | 2 | 3 | 4 | | 5 | |
| | Departure Permission at Bus Stop | 1 | 2 | 3 | 4 | | 5 | |
| | Passing Permission for Crosswalk | 1 | 2 | 3 | 4 | | 5 | |
| | Overtaking Permission for Obstacle | 1 | 2 | 3 | 4 | 6 | 5 | |
| | Lane Departure Traveling Permission | 1 | 2 | 3 | 4 | 6 | 5 | |
| | Door Open/Close Permission | 1 | | 3 | | 2 | 4 | 4 |
| | Door Open/Close Alert | 1 | | 3 | | 2 | 4 | 4 |
| | Wheelchair Ramp Unfolding Permission | 1 | | 3 | | 2 | 4 | 4 |
| | Wheelchair Ramp Unfolding Alert | 1 | | 3 | | 2 | 4 | 4 |
| | Completion Confirmation of Passenger Boarding/Existing | 1 | | | | | 2 | 3 |
| | Passenger Status Confirmation at Departure | 1 | | | | | 2 | 3 |
| | Passenger Alert | 1 | | | | | 2 | 3 |
| | Passenger Support | 1 | 2 | 3 | | | 2 | 4 |

*FIG. 3B*

FEATURE OF CURRENT ASSISTANCE SCENE

| FEATURE ITEM | FEATURE VALUE | INDEX ITEM | PRIORITY |
|---|---|---|---|
| Check Target | traffic outside vehicle | Yes | 1 |
| Service Area | area A | Yes | 2 |
| Location | bus stop A-3 | Yes | 3 |
| Road Shape | straight | Yes | 4 |
| Vehicle Shape | midium bus | No | Don't Care |
| Surrounding Object | vehicle, pedestrian | Yes | 5 |
| Passenger | 1 person | No | Don't Care |

FEATURE OF LAST ASSISTANCE SCENE

| FEATURE ITEM | FEATURE VALUE |
|---|---|
| Check Target | traffic outside vehicle ✓ |
| Service Area | area A ✓ |
| Location | bus stop A-1 |
| Road Shape | bus lane |
| Vehicle Shape | small bus |
| Surrounding Object | pedestrian |
| Passenger | 0 passengers |

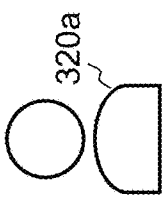

| FEATURE ITEM | FEATURE VALUE |
|---|---|
| Check Target | near door ✗ |
| Service Area | area A |
| Location | bus stop A-3 |
| Road Shape | straight |
| Vehicle Shape | midium bus |
| Surrounding Object | vehicle, pedestrian |
| Passenger | 1 person |

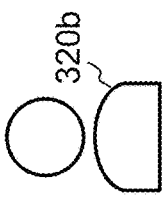

| FEATURE ITEM | FEATURE VALUE |
|---|---|
| Check Target | traffic outside vehicle ✓ |
| Service Area | area C ✗ |
| Location | intersection C-3 |
| Road Shape | crossroad |
| Vehicle Shape | small bus |
| Surrounding Object | vehicle |
| Passenger | 2 persons |

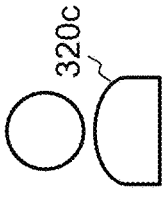

CANDIDATE OPERATOR

FIG. 4A

FEATURE OF CURRENT ASSISTANCE SCENE

| FEATURE ITEM | FEATURE VALUE | INDEX ITEM | PRIORITY |
|---|---|---|---|
| Check Target | inside vehicle | Yes | 1 |
| Service Area | area B | No | Don't Care |
| Location | section B-2 | No | Don't Care |
| Road Shape | bus lane | No | Don't Care |
| Vehicle Shape | small bus | Yes | 2 |
| Surrounding Object | vehicle, pedestrian | No | Don't Care |
| Passenger | 3 persons | Yes | 3 |

FEATURE OF LAST ASSISTANCE SCENE

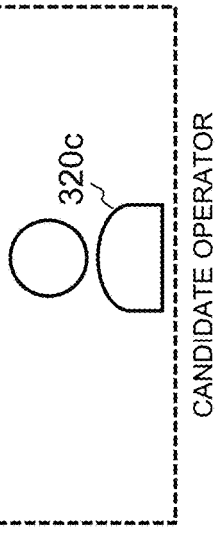

| FEATURE ITEM | FEATURE VALUE |
|---|---|
| Check Target | inside vehicle ✓ |
| Service Area | area C |
| Location | intersection C-3 |
| Road Shape | crossroad |
| Vehicle Shape | small bus ✓ |
| Surrounding Object | vehicle |
| Passenger | 2 passengers ⚞ |

CANDIDATE OPERATOR

320c

| FEATURE ITEM | FEATURE VALUE |
|---|---|
| Check Target | near door ✗ |
| Service Area | area A |
| Location | bus stop A-2 |
| Road Shape | straight |
| Vehicle Shape | medium bus |
| Surrounding Object | vehicle, pedestrian |
| Passenger | 1 passenger |

320b

| FEATURE ITEM | FEATURE VALUE |
|---|---|
| Check Target | inside vehicle ✓ |
| Service Area | area B |
| Location | section B-2 |
| Road Shape | bus lane |
| Vehicle Shape | large bus ✗ |
| Surrounding Object | vehicle, pedestrian |
| Passenger | 3 passengers |

REMOTE ASSISTANCE SYSTEM AND REMOTE ASSISTANCE METHOD

CROSS-REFERENCE TO RELATED APPLICATION

The present application claims priority under 35 U.S.C. § 119 to Japanese Patent Application No. 2022-149059, filed Sep. 20, 2022, the contents of which application are incorporated herein by reference in their entirety.

TECHNICAL FIELD

Background

The present disclosure relates to a technique for remote assistance of a vehicle.

Background Art

In recent years, a remote assistance system has been considered in which an operator that processes a remote assistance request is selected from a plurality of operators and assigned to an autonomous driving vehicle which issues the remote assistance request.

For example, Patent Literature 1 discloses a remote instruction system comprising a remote instruction point situation recognition unit configured to recognize a remote instruction point situation on a target route, a time prediction unit configured to predict a monitoring start time and a monitoring end time of a remote commander (operator) for the remote instruction point situation on the target route, and a monitoring time allocation unit configured to allocate a monitoring time, which is a time between the monitoring start time and the monitoring end time, to a plurality of remote commanders (operators) based on the monitoring start time and the monitoring end time of the remote instruction point situation in a plurality of autonomous driving vehicles.

LIST OF RELATED ART

Patent Literature 1: JP 2021/026696 A

SUMMARY

It is assumed that remote assistance requests are issued from various autonomous driving vehicles in various scenes. For this reason, if an operator to be assigned is randomly selected each time in response to a remote assistance request, the operator is required to recognize various traffic environments and respond to various tasks one after another. As a result, the operator may feel a much greater burden as compared with a case where the operator continuously supports one autonomous driving vehicle.

In view of the above problems, an object of the present disclosure is to provide a technique capable of reducing a burden on the assigned operator in a case where an operator that processes a remote assistance request is selected from a plurality of operators and assigned to an autonomous driving vehicle which issues the remote assistance request.

A first aspect of the present disclosure is directed to a remote assistance system for providing a remote assistance function of a vehicle by a plurality of operators.

The remote assistance system according to the first aspect comprises:

a memory storing a database that manages, for each of the plurality of operators, feature values of a plurality of feature items regarding a last assistance scene that is a target scene in a last processed remote assistance request; and one or more processors.

The one or more processors are configured to execute:
when a new assistance request is received from the vehicle, specifying one or more index items from the plurality of feature items as indicators for similarity determination between the last assistance scene and a current assistance scene that is a target scene in the new assistance request;

specifying, from the plurality of operators, one or more candidate operators whose the last assistance scene is similar to the current assistance scene based on the feature values of the one or more index items; and selecting an operator to process the new assistance request from the one or more candidate operators.

A second aspect of the present disclosure is directed to a remote assistance method for providing, by a computer, a remote assistance function of a vehicle by a plurality of operators.

The remote assistance method according to the second aspect includes:

managing, for each of the plurality of operators, feature values of a plurality of feature items regarding a last assistance scene that is a target scene in a last processed remote assistance request;

when a new assistance request is received from the vehicle, specifying one or more index items from the plurality of feature items as indicators for similarity determination between the last assistance scene and a current assistance scene that is a target scene in the new assistance request;

specifying, from the plurality of operators, one or more candidate operators whose the last assistance scene is similar to the current assistance scene based on the feature values of the one or more index items; and selecting an operator to process the new assistance request from the one or more candidate operators.

According to the present disclosure, one or more candidate operators whose the last assistance scene is similar to the current assistance scene are specified from the plurality of operators based on the feature values of the specified one or more index items. The one or more candidate operators specified in this way are expected to have a smaller burden than the other operators when processing the new remote assistance request. Then, an operator to process the new remote assistance request is selected from the one or more candidate operators. It is thus possible to reduce a burden on each of the plurality of operators.

BRIEF DESCRIPTION OF DRAWINGS

FIG. 2A is a table showing an example of category and description of a remote assistance requests issued by an autonomous driving vehicle;

FIG. 2B is a table showing an example of feature items and possible feature values of each feature item;

FIG. 3A is a diagram showing an example of a list defining index items for each category of the remote assistance request;

FIG. 3B is a diagram showing an example of a list defining index items for each category of the remote assistance request;

FIG. 4A is a conceptual diagram showing a practical example of the remote assistance system according to the present embodiment;

FIG. 4B is a conceptual diagram showing a practical example of the remote assistance system according to the present embodiment;

DETAILED DESCRIPTION

Hereinafter, an embodiment will be described with reference to the drawings.

1. Configuration

Figure 1:
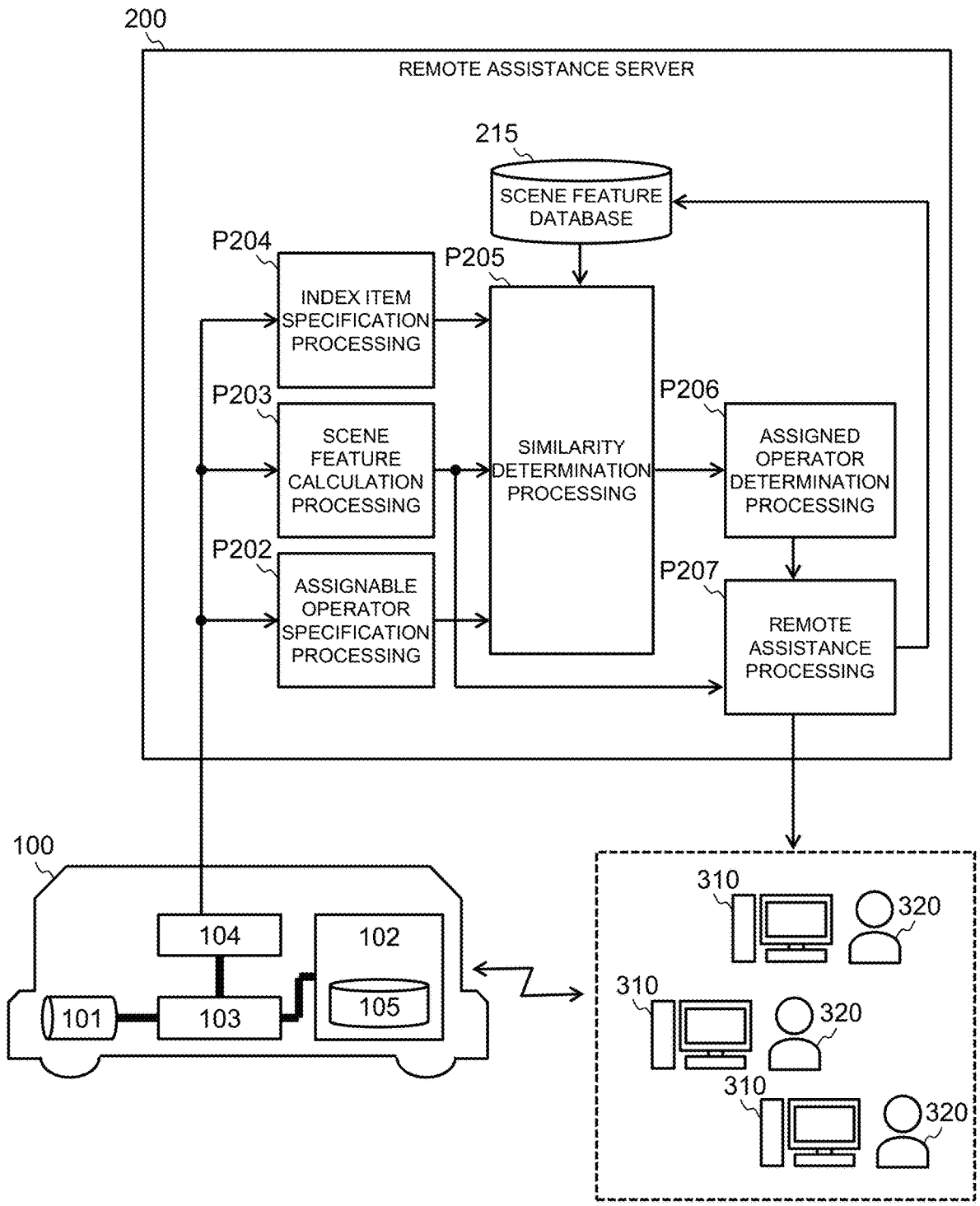
FIG. 1 is a block diagram showing a configuration of a remote assistance system according to the present embodiment.

FIG. 1 is a block diagram illustrating a configuration of a remote assistance system 10 according to the present embodiment. The remote assistance system 10 according to the present embodiment provides a remote assistance function of the vehicle 100 by the plurality of operators 320. To be more specific, the remote assistance system 10 according to the present embodiment selects and assigns the operator 320 that processes the remote assistance request from the plurality of operators 320 to the vehicle 100 that issues the remote assistance request. The operator 320 to be assigned (hereinafter also referred to as an "assigned operator") operates the remote support terminal 310 to perform remote support of the vehicle 100 that issues the remote support request.

In this embodiment, the vehicle 100 is an autonomous driving vehicle. That is, the vehicle 100 performs recognition of the surrounding environment, driving determination according to the recognition result, and autonomous traveling according to the driving determination by the automatic driving function. Then, the vehicle 100 issues a remote assistance request in a case where it is impossible or difficult to perform driving determination in the autonomous driving function. Hereinafter, the vehicle 100 is referred to as an autonomous driving vehicle 100.

FIG. 2A shows an example of the type and content of a remote assistance request issued by an autonomous driving vehicle 100. For example, in a case where the autonomous driving vehicle 100 recognizes a pedestrian near a crosswalk in the vicinity of the crosswalk, when a sufficient degree of certainty is not given as to whether or not the pedestrian will cross the crosswalk, the autonomous driving vehicle 100 issues a remote support request of "Passing Permission for Crosswalk". For example, in a case where the autonomous driving vehicle 100 tries to open a door for getting off a passenger, when the timing at which the opening of the door does not interfere with the surroundings cannot be determined with sufficient accuracy, the autonomous driving vehicle 100 issues a remote support request of "Door Open/Close Permission". Note that the autonomous driving vehicle 100 may simultaneously issue a plurality of types of remote assistance requests. For example, the autonomous driving vehicle 100 may simultaneously issue remote support requests of "Door Open/Close Permission" and "Door Open/Close Alert".

Refer to FIG. 1 again. The autonomous driving vehicle 100 includes a sensor 101, a storage device 102, a control device 103, and a communication device 104. The control device 103 is connected to the sensor 101, the storage device 102, and the communication device 104 so that information can be transmitted therebetween (thick lines in FIG. 1). For example, the controller 103 is connected to these devices via an in-vehicle network including a control area network (CAN) or the like.

The sensor 101 is a sensor for recognizing a surrounding environment and a road structure. Examples of the sensor 101 include a light detection and ranging (LiDAR), a radar, a camera, and the like. The recognition information of the sensor 101 is transmitted to the controller 103.

The memory 102 stores information related to an autonomous driving function. The memory 102 is constituted by recording media such as an HDD and an SSD. In particular, the storage device 102 stores map information 105. The map information 105 is typically information indicating a position of a road, a structure, or the like on a map. The control device 103 can acquire the map information 105 by accessing the storage device 102.

The communication device 104 communicates with a device outside the autonomous driving vehicle 100 to transmit and receive information. In particular, the communication device 104 includes a device that communicates with the remote assistance server 200 and the remote support terminal 310. For example, the communication device 104 communicates with the remote assistance server 200 and the remote support terminal 310 via a mobile communication network and the Internet. The communication device 104 may be configured to start communication with the remote support terminal 310 corresponding to the allocation operator in response to the determination of the allocation operator. Information received by the communication device 104 is transmitted to the controller 103.

The control device 103 executes processing related to the autonomous driving function based on the recognition information of the sensor 101 and the map information 105. That is, autonomous driving of the autonomous controller 103 is realized by the autonomous driving vehicle 100 executing the processing. The controller 103 includes, for example, one or a plurality of in-vehicle electronic control units (ECUs). In particular, the control device 103 executes a process of generating a remote assistance request in a case where it is impossible or difficult to perform driving determination in the autonomous driving function. Then, the control device 103 transmits the generated remote support request to the remote assistance server 200 via the communication device 104. Thereafter, the control device 103 receives the determination of the assignment operator with respect to the remote support request via the communication device 104, and causes the autonomous driving vehicle 100 to autonomously travel in accordance with the determination of the assignment operator.

Here, when transmitting the remote assistance request to the remote assistance server 200, the control device 103 is configured to further transmit, to the remote assistance server 200, information (scene information) the remote support request to the remote assistance server. Examples of the scene information include point group data detected by the LiDAR, image data captured by the camera, a position of the autonomous driving vehicle 100 on a map, map information 105 around the autonomous driving vehicle 100, attributes (vehicle specifications, body type, and the like) of the autonomous driving vehicle 100, information on passengers (number of passengers, attributes, position, state, and the like), and the like. The scene information can be obtained as a processing result of the controller 103 or recognition information of the sensor 101.

In the remote assistance system 10 according to the present embodiment, the remote assistance function is realized by the remote assistance server 200 executing processing. The remote assistance server 200 is typically a computer accessible via the Internet. In this case, the remote assistance server 200 may be a cloud server or a dedicated server. In particular, the remote assistance server 200 may be configured to communicate with the autonomous driving vehicle 100 and the remote assistance device 310. The configuration of the remote assistance server 200 will be described later.

The processing executed by the remote assistance server 200 includes an assignable operator specification processing P202, a scene feature calculation processing P203, an index item specification processing P204, a similarity determination processing P205, an assigned operator determination processing P206, and a remote assistance processing P207.

The assignable operator specification processing P202 receives a new remote support request from the autonomous driving vehicles 100 and identifies an allocable operator 320 among the plurality of operators 320. For example, the assignable operator specification processing P202 specifies one or more operators 320 who are not currently performing remote support or operators 320 who are currently performing remote support but are permitted to interrupt other remote support based on the remote support statuses of the plurality of operators 320. When there is no operator 320 to which assignment is possible, the assignable operator specification processing P202 may be configured to wait until there is one or more operators to which assignment is possible. Alternatively, the assignable operator specification processing P202 may be configured to reject the remote assistance request from the autonomous driving vehicles 100.

The scene feature calculation processing P203 calculates a feature (scene feature) of a scene that is a target of the currently received remote assistance request based on the scene information received from the autonomous driving vehicles 100. Here, the scene feature is represented by a combination of feature values of a plurality of feature items. FIG. 2 b illustrates an example of a feature item and a possible feature value for each feature item. For example, the scene feature calculation processing P203 calculates the feature value of the "Service Area" as the area A from the map information 105 and the position of the autonomous driving vehicles 100 acquired as the scene information.

Table 1 shows an example of the scene feature calculated by the scene feature calculation processing P203. The scene feature shown in Table 1 is, for example, a case where the autonomous driving vehicle 100, which is a medium-sized bus, issues a remote support request of "Departure Permission at Bus Stop" near the bus stop B in the area A.

TABLE 1

| FEATURE ITEM | FEATURE VALUE |
| --- | --- |
| Check Target | trafic outside vehicle |
| Service Area | area A |
| Location | bus stop B |
| Road Shape | straight |
| Vehicle Shape | medium bus |
| Surrounding Object | — |
| Passenger | one passenger |

Note that the remote assistance server 200 may be configured to acquire the scene feature as the scene information. In this case, the scene feature calculation processing P203 is realized in the autonomous driving vehicle 100. For example, it is realized by the control device 103 of the autonomous driving vehicle 100. The one or more characteristic elements may be determined in advance in accordance with an environment to which the remote assistance system 10 according to the present embodiment is applied, or may be determined in accordance with the type of the remote support request received this time.

The mode of the possible feature values shown in FIG. 2B is merely an example, and other modes may be employed. For example, the feature values of the respective feature items shown in FIG. 2B may be modified as follows.

The feature value of the "Check Target (Attention Direction)" can also be represented by a binary number representing a combination of cameras that present video to the operator 320. The feature value of the "Service Area" can be expressed by the maximum value and the minimum value of the latitude and longitude. The feature value of "Location" can also be expressed by latitude and longitude (GPS position) or a relative position on a map (localized position). The feature value of the "Road Shape" can be expressed by a numerical value representing a curvature, a road width, the number of lanes, the number of branches, or the like. The feature value of the "Vehicle Shape" can also be expressed by a numerical value representing a total length, a total width, a vehicle type, or the like. The feature value of the "Surrounding Object" may be represented by a list of vector information representing the type, relative position, relative speed, and the like of the target for each target. The feature value of "Passenger" can also be represented by a list of vector information representing each piece of information for each passenger who recognizes the inside of the vehicle cabin.

Refer to FIG. 1 again. The index item specification processing P204 specifies one or a plurality of indicator elements as indicators for similarity determination with respect to a scene that is a target of the currently received remote support request among the plurality of feature items. For example, the index item specification processing P204 specifies one or more indicator elements in accordance with the type of the currently received remote support request. In this case, the index item specification processing P204 can specify one or more indicator elements by referring to a list in which indicator elements are defined for each type of remote assistance request.

FIG. 3A illustrates an example of a list in which index items are defined for each type of remote assistance request. In the list illustrated in FIG. 3A, a characteristic element in which a check mark is written is defined as an index element for the type of the remote assistance request. For example, when the type of the remote support request received this time is "Departure Permission at Intersection", the index item specification processing P204 specifies "Check Target", "Service Area", "Location", "Road Shape", and "Surrounding Object" as indicator factors.

The index item specification processing P204 may be further configured to set priorities for the specified one or more indicator elements. For example, the index item specification processing P204 can specify one or more indicator components and set priorities by referring to a list in which indicator components and priorities are defined for each type of remote assistance request.

FIG. 3B illustrates an example of a list in which index items and priorities are defined for each type of remote assistance request. In the list shown in FIG. 3B, a characteristic element in which a numerical value is described is defined as an index element with respect to the type of the remote support request, and the priority order of the index element is defined by the numerical value. For example, when the type of the remote support request received this time is "Passenger Alert", the index item specification processing P204 specifies "Check Target", "Vehicle Shape", and "Passenger" as indicator elements, and sets priorities 1, 2, and 3 in this order.

The lists shown in FIGS. 3A and 3B may be given in advance in accordance with the environment to which the remote assistance system 10 is applied. Here, the index element defined for the type of the remote support request may be a feature item related to a burden when the operator 320 processes the type of the remote support request among the plurality of feature items. In addition, the priority order may be an order of magnitude of influence on a burden when the operator 320 processes the type of remote assistance request.

Refer to FIG. 1 again. The similarity determination processing P205 determines similarity between a scene (hereinafter referred to as a "last assistance scene") which is a target of a remote support request previously processed by the operator 320 and a scene (hereinafter referred to as a ""current assistance scene") which is a target of the remote support request received this time for each of the operators 320 to which assignment is possible. Then, the similarity determination processing P205 outputs, as a processing result, an operator 320 whose last assistance scene is similar to the current assistance scene (hereinafter referred to as a "candidate operator") among the operators 320 that can be assigned.

The similarity determination processing P205 performs similarity determination by comparing the scene feature of the last assistance scene with the scene feature of the current assistance scene. Here, the scene feature of the last assistance scene of each of the plurality of operators 320 is managed as the scene feature database 215. That is, the similarity determination processing P205 can acquire the scene feature of the last assistance scene for each of the operators 320 to which assignment is possible by referring to the scene feature database 215.

In particular, the similarity determination processing P205 performs the similarity determination based on the feature value of the specified one or more indicator elements. An example of processing performed by the similarity determination processing P205 will be described below with reference to FIGS. 4A and 4B. FIGS. 4A and 4B illustrate examples of the scene feature of the last assistance scene of the operator 320 that can be assigned to the scene feature of the current assistance scene. In FIGS. 4A and 4B, the operators 320 that can be assigned are three operators, 320a, 320b, and 320c. In addition, in FIGS. 4A and 4B, a priority order is set to the one or more specified index items.

First, reference is made to FIG. 4A. The similarity determination processing P205 performs similarity determination of the feature value with respect to the current assistance scene in the order of the indicator elements according to the priorities. Therefore, the similarity determination processing P205 first performs the similarity determination of the feature value of the "Check Target" having the precedence order of 1. Here, the similarity determination processing P205 can determine whether or not they are similar from the fact that the feature values match each other. Therefore, the similarity determination processing P205 can determine that the operator 320b does not have the similarity between the last assistance scene and the current assistance scene by the similarity determination of the feature value of the "Check Target". Next, the similarity determination processing P205 performs the similarity determination of the feature value of the "Service Area" having the precedence 2. At this time, the similarity determination processing P205 may exclude the operator 320b from the target of the similarity determination. The similarity determination processing P205 can determine that the last assistance scene of the operator 320c is not similar to the current assistance scene based on the similarity determination of the feature value of the "Service Area". At this point in time, among the operators 320 that can be assigned, the operator 320 (hereinafter referred to as a "target operator") for which the last assistance scene is not determined to be dissimilar to the current assistance scene is only the operator 320a. Therefore, the similarity determination processing P205 sets the operator 320a as a candidate operator.

Reference is now made to FIG. 4 b. When similarity determination is performed similarly to the case described in FIG. 4A, in the example illustrated in FIG. 4 b, it is understood that the similarity determination processing P205 sets the operator 320c as a candidate operator.

When a plurality of target operators remain at the time when the similarity determination of the feature value is performed for all of the one or plurality of specified indicator elements, the similarity determination processing P205 may set the plurality of remaining target operators as candidate operators. In addition, when there is no more target operator due to the similarity determination of a certain feature value, the similarity determination processing P205 may be configured to skip the similarity determination of the feature value. Thus, it is possible to avoid a situation in which no candidate operator exists.

In this way, the similarity determination processing P205 performs the similarity determination based on the feature value of the specified one or more indicator elements. On the other hand, the similarity determination processing P205 does not perform similarity determination for feature items that are not indicator elements. As a result, it can be expected that the candidate operator specified by the similarity determination processing P205 is less burdened than the other operators 320 when processing the currently received remote support request.

For example, the example illustrated in FIG. 4A can be considered as a case where the autonomous driving vehicle 100 issues a remote assistance request of "Departure Permission at Intersection". In this case, it is considered that the "Check Target" or the "Service Area" serving as the index element has a large influence on the load when the operator 320 processes the remote support request. On the other hand, it is considered that the "Vehicle Shape" and the "Passenger" have little influence on the burden when the operator 320 processes the remote support request. In the example illustrated in FIG. 4A, the operator 320a who has confirmed and determined the out-of-vehicle traffic in the same area as the current assistance scene is the candidate operator. When the operator 320a processes the remote assistance request of "Departure Permission at Intersection", the operator SL can start remote assistance in a state familiar with the region-specific traffic environment. As a result, the operator 320a is expected to be less burdened when processing the remote assistance request received this time.

In addition, for example, the example illustrated in FIG. 4B can be considered as a case where the autonomous driving vehicle 100 issues a remote support request of "Passenger Alert". In this case, it is considered that the "Check Target" or the "Vehicle Shape" serving as the index element has a large influence on the load when the operator 320 processes the remote support request. On the other hand, the "Service Area" and the "Location" are considered to have little influence on the load when the operator 320 processes the remote assistance request. In the example illustrated in FIG. 4B, the operator 320c who has checked and determined the interior of the vehicle having the same shape as that in the current assistance scene is a candidate operator. The operator 320c can initiate remote assistance in a manner familiar to the structure of the car in processing the request for remote assistance of "Passenger Alert". As a result, the operator 320c is expected to be less burdened when processing the remote assistance request received this time.

Furthermore, in the examples illustrated in FIGS. 4A and 4B, the similarity determination of the feature value with respect to the current assistance scene is performed in the order of the index items according to the priority order. By performing the similarity determination in this manner, it is possible to preferentially specify, as the candidate operator, the operator 320 who is particularly similar to the index element having a large influence on the load when the last assistance scene and the current assistance scene are processed in the remote support request. As a result, it is possible to preferentially specify, as the candidate operator, the operator 320 who is less burdened when processing the remote assistance request received this time.

For example, in the example illustrated in FIG. 4A, the operator 320b has a larger number of similar index items than the operator 320a. However, the operator 320b is not similar to the current assistance scene with respect to the "Check Target" which is the highest-priority indicator and has a large influence on the load when the remote support request is processed. Therefore, it is assumed that the operator 320b has a larger burden when processing the remote assistance request than the operator 320a. As described above, in the example illustrated in FIG. 4A, it is understood that the operator 320a who is assumed to have a smaller burden when processing the currently received remote support request can be appropriately specified as the candidate operator.

The similarity determination processing P205 can also adopt processing from another viewpoint for the similarity determination based on the feature values of the one or more specified indicator elements.

Another aspect is to calculate the degree of similarity between the last assistance scene and the current assistance scene on the basis of the feature value of the specified one or more index items for each of the operators 320 to which assignment is possible.

For example, the similarity determination processing P205 can calculate, for each of one or more indicator elements, a similarity point indicating a degree of similarity between the feature value of the last assistance scene and the feature value of the current assistance scene according to a predetermined criterion, and calculate the sum of the similarity points for each of one or more indicator elements as the degree of similarity. In this case, the predetermined criterion is that, for example, for the index element of "Check Target", the similarity point between "traffic outside vehicle" and "inside vehicle" is given 1 point, and the similarity point when there is a match in "traffic outside vehicle" is given 3 points. In addition, for example, when the feature value is represented by a numerical value, the similarity determination processing P205 can calculate a difference or a distance in a predetermined space between the feature value of the last assistance scene and the feature value of the current assistance scene for each of one or more indicator elements, and calculate a reciprocal of a sum of the difference or the distance for each of one or more indicator elements as the degree of similarity. Furthermore, the similarity determination processing P205 may be configured to calculate the sum by weighting the similarity point, the difference, or the distance of each of the one or more indicator elements. In this case, the index item specification processing P204 may be configured to weight the specified one or more indicator elements. For example, the index item specification processing P204 can specify and weight one or a plurality of indicator elements by referring to a list in which numerical values indicating weights are given to the types of remote assistance requests as in FIG. 3B. By thus weighting and calculating the sum, it is possible to further increase the contribution of the index element having a large influence on the load in processing the remote support request to the similarity.

Then, the similarity determination processing P205 determines the operator 320 whose similarity is equal to or greater than a predetermined value as a candidate operator. Here, the predetermined thresholds may be suitably determined in accordance with the environment to which the remote assistance system 10 is applied. At this time, the similarity determination processing P205 may be configured to output the similarity of each of the specified one or more candidate operators as a processing result. By performing the similarity determination in this manner, it is possible to prevent the operator 320 to which a certain load or more is applied when processing the currently received remote support request from being specified as a candidate operator.

From this viewpoint, the similarity determination processing P205 may be configured to set the operator 320 having the maximum similarity as a candidate operator.

These aspects can be employed in combination. For example, the similarity determination processing P205 may be configured to perform the similarity determination of the feature value with respect to the current assistance scene in the order of the indicator elements according to the priorities for the operators 320 whose similarities are equal to or greater than a predetermined value among the operators 320 to which the assignment is possible.

Further, the similarity determination processing P205 may be configured to set the operator 320 whose last assistance scene is not managed by the scene feature database 215 as one of the candidate operators. With such a configuration, it is possible to avoid a situation in which the operator 320 who performs remote support for the first time is not identified as a candidate operator at all.

In such a configuration, the similarity determination processing P205 may be configured to calculate the highest similarity of the operator 320 whose last assistance scene is not managed by the scene feature database 215 among the one or more specified candidate operators. This is because such an operator 320 can start remote assistance in a state without prejudice, and can be expected to have a small burden for any remote assistance request.

Alternatively, the similarity determination processing P205 may be configured to calculate such a degree of similarity of the operator 320 as a constant height value. This is because it is considered that a candidate operator having an extremely high similarity value is expected to have a further smaller burden than such an operator 320.

As described above, the similarity determination processing P205 outputs one or more candidate operators specified as the processing result.

Refer to FIG. 1 again. The assigned operator determination processing P206 determines an operator 320 to be selected from one or more candidate operators as an assignment operator. When the specified candidate operator is one, the assigned operator determination processing P206 may be configured to select the one candidate operator. When a plurality of candidate operators is specified, the assigned operator determination processing P206 selects, for example, the operator 320 randomly from the plurality of candidate operators. Alternatively, when the similarity determination processing P205 outputs the similarity of each of a plurality of candidate operators as the processing result, the assigned operator determination processing P206 may be configured to select the candidate operator having the highest similarity. Alternatively, the assigned operator determination processing P206 may be configured to select the operator 320 based on another indicator such as the number of times of assignment of the remote support performed so far. For example, the assigned operator determination processing P206 selects the operator 320 so as to reduce the bias of the number of assignments of the remote support.

The remote assistance processing P207 notifies the remote assistance terminals 310 corresponding to the determined assignment operators that the remote assistance of the autonomous driving vehicles 100 that issue the remote assistance request received this time has been assigned. Upon receiving the notification, the remote support device 310 starts communication with the autonomous driving vehicle 100. Thus, remote support between the remote support device 310 and the autonomous driving vehicle 100 is performed. The remote support terminal 310 presents information necessary for remote support to the operator 320, and receives an operation related to remote support by the operator 320 (for example, input of determination with respect to a remote assistance request). The operation related to the remote support accepted by the remote support device 310 is transmitted to the autonomous driving vehicle 100. As a result, the assigned operator remotely supports the autonomous driving vehicle 100.

Further, the remote assistance processing P207 updates the scene feature database 215 with the scene feature of the current assistance scene as the scene feature of the last assistance scene for the assigned operator. Thus, the scene feature database 215 can be constructed.

As described above, the remote assistance system 10 according to the present embodiment is configured. In addition, in the remote assistance system 10 according to the present embodiment, generally, there may be a plurality of autonomous driving vehicle 100 as a target of remote assistance.

Figure 5:
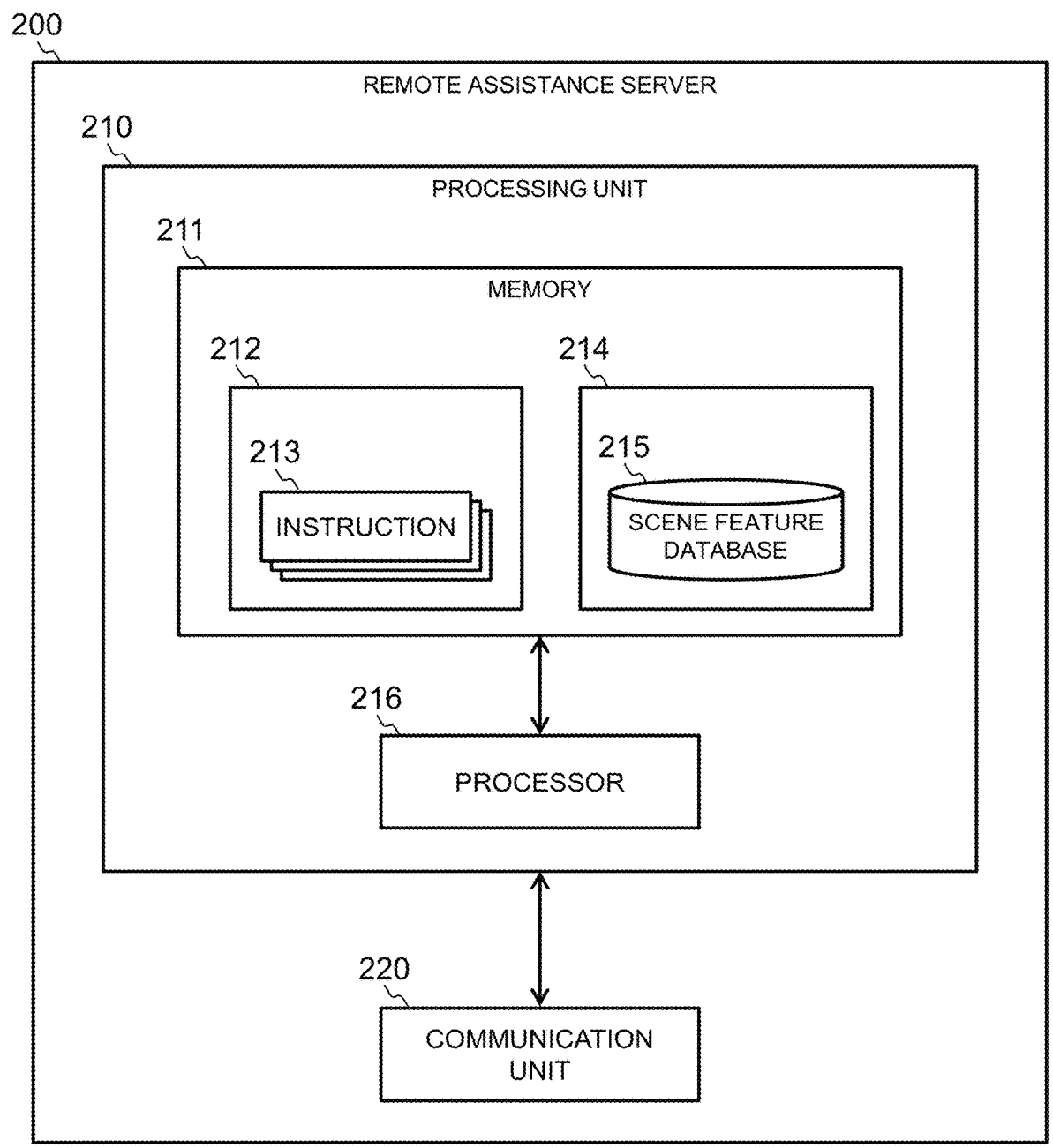
FIG. 5 is a block diagram showing a configuration of a remote assistance server according to the present embodiment.

Next, the configuration of the remote assistance server 200 will be described with reference to FIG. 5. FIG. 5 is a block diagram showing a preferred example of the configuration of the remote assistance server 200. The remote assistance server 200 includes a processing unit 210 and a communication unit 220.

The communication unit 220 communicates with an external device of the remote assistance server 200 to transmit and receive information. In particular, the communication unit 220 communicates with the autonomous driving vehicle 100 and the remote support terminal 310. Typically, the communication unit 220 communicates with the autonomous driving vehicle 100 and the remote support terminal 310 via the Internet. The communication unit 220 realizes reception of a remote support request and scene information, and transmission of a notification of assignment of remote support to the remote support terminal 310.

The processing unit 210 executes processing related to the remote support function. The processing unit 210 is a computer including a storage device 211 and a processor 216.

The memory 211 is coupled to the processor 216 and stores a plurality of instructions 213 executable by the processor 216 and various kinds of information 214 required for execution of processing. The memory 211 can be constituted by recording media such as a ROM, a RAM, an HDD, and an SSD.

The instructions 213 are provided by the computer program 212. The plurality of instructions 213 are also configured to cause the processor 216 to perform operations associated with the remote assistance function. That is, when the processor 216 operates in accordance with the plurality of instructions 213, the processor 216 functions as the assignable operator specification processing P202, the scene feature calculation processing P203, the index item specification processing P204, the similarity determination processing P205, the assigned operator determination processing P206, and the remote assistance processing P207. The processor 216 can be constituted by a CPU or the like including an arithmetic unit, a register, or the like.

The date 214 includes information acquired by the remote assistance server 200, parameter information of the computer program 212, and the like. In particular, datum 214 includes a scene feature database 215. The scene feature database 215 is updated by a process executed by the processor 216.

Here, the scene feature database 215 may be configured to continuously hold the scene feature of the last assistance scene for each of the plurality of operators 320, or may be configured to delete the scene feature of the last assistance scene for some of the operators 320 by processing executed by the processor 216. For example, the processor 216 may be configured to execute a process of deleting the scene feature managed by the scene feature database 215 as follows.

One example is to delete a scene feature for an operator 320 for which a certain amount of time has elapsed since the last update.

Another example is to delete the scene feature for the operator 320 who has left his/her seat or made a break. In this case, the absence or break can be determined by detecting that the remote support terminal 310 has not been operated for a certain period of time or that the operator 320 has performed an explicit operation (for example, the absence button is pressed).

Another example is to delete a scene feature for an operator 320 who has finished a day's work or an operator 320 who will start a day's work.

By configuring the processor 216 to execute the process of deleting the scene feature in this manner, it is possible to express the operator 320 who is assumed to have no feeling of the last assistance scene support scene. Since it can be expected that the burden on the operator 320 is small in response to any remote assistance request, the processor 216 may be configured to execute a process of updating the feature value of each of the plurality of feature items to a special value similar to any feature value instead of deleting the scene feature in the same case as described above.

The remote assistance server 200 is configured as described above.

2. Process

Hereinafter, processing executed by the remote assistance server 200 will be described.

Figure 6:
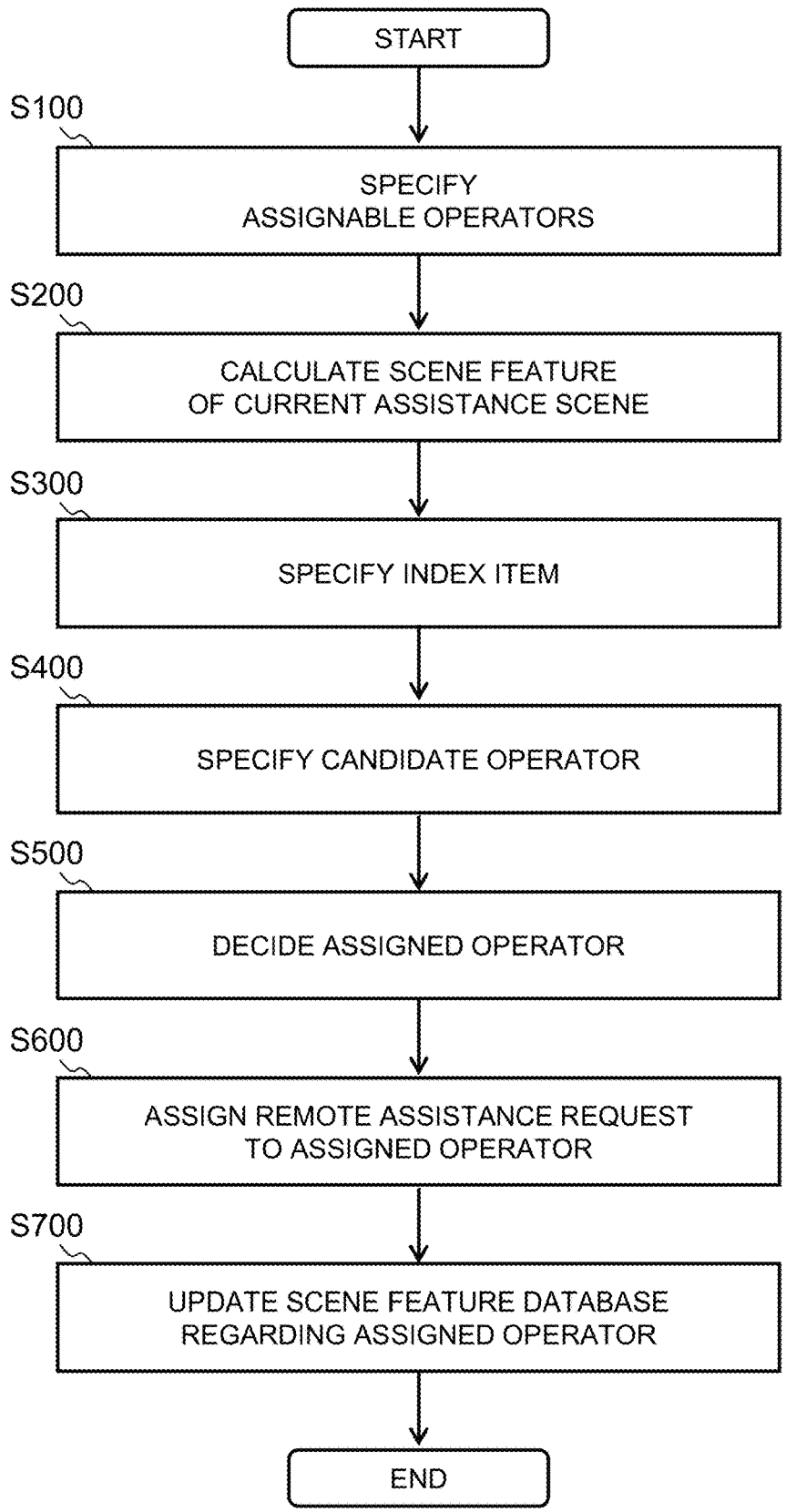
FIG. 6 is a flowchart showing processes executed by the remote assistance server according to the present embodiment.

FIG. 6 is a flowchart illustrating processing executed by the remote assistance server 200, more specifically, processing executed by the processor 216. The flowchart illustrated in FIG. 6 typically starts when a new remote assistance request is received from the autonomous driving vehicle 100.

In Step S100, the remote assistance server 200 uses the assignable operator specification processing P202 to specify an allocable operator 320 among the plurality of operators 320. In step S200, the remote assistance server 200 calculates the scene feature of the current assistance scene by the scene feature calculation processing P203. In step S300, the remote assistance server 200 specifies one or a plurality of index items as indicators of similarity determination for the current assistance scene by the indicator element-specifying index item specification processing P204. Here, the processes related to steps S100, S200, and S300 may be executed in random order. Alternatively, the processes related to steps S100, S200, and S300 may be executed in parallel.

Next, in step S400, the remote assistance server 200 causes the similarity determination processing P205 to perform similarity determination based on the feature values of the one or more specified index items, and specifies one or more candidate operators from the operators 320 to which assignment is possible.

Next, in step S500, the remote assistance server 200 selects the operator 320 to process the remote assistance request received this time from the specified one or more candidate operators by the assignment assigned operator determination processing P206.

Next, in step S600, the remote assistance server 200 causes the remote assistance processing P207 to allocate the remote support of the autonomous driving vehicles 100 to the determined assigned operator.

Next, in step S700, the remote assistance server 200 causes the remote assistance processing P207 to update the scene feature database 215 with the feature of the current assistance scene as the scene feature of the last assistance scene for the assigned operator. After step S700, the current process is terminated.

As described above, the processing is executed by the remote assistance server 200 (processor 216). When the remote assistance server 200 executes processing in this manner, a remote support method for providing the remote support function according to the present embodiment by a computer is realized.

What is claimed is:

1. A remote assistance system for providing a remote assistance function of a vehicle by a plurality of operators, the remote assistance system comprising:
a memory storing a database that manages, for each of the plurality of operators, feature values of a plurality of feature items regarding a last assistance scene that is a target scene in a last processed remote assistance request; and
one or more processors configured to execute:
when a new assistance request is received from the vehicle, specifying one or more index items from the plurality of feature items as indicators for similarity determination between the last assistance scene and a current assistance scene that is a target scene in the new assistance request;
specifying, from the plurality of operators, one or more candidate operators whose the last assistance scene is similar to the current assistance scene based on the feature values of the one or more index items; and
selecting an operator to process the new assistance request from the one or more candidate operators.

2. The remote assistance system according to claim 1, wherein
the specifying the one or more index items includes setting a priority of the one or more index items, and
the specifying the one or more candidate operators includes:
performing the similarity determination based on the feature value of each of the one or more index items in descending order of the priority, and sequentially excluding an operator determined that the last assistance scene is not similar to the current assistance scene from target operators subject to the similarity determination; and
when the target operators have become alone or when the similarity determination has been performed for all of the one or more index items, specifying the target operators as the one or more candidate operators.

3. The remote assistance system according to claim 1, wherein
the specifying the one or more candidate operators includes:
calculating, for each of the plurality of operators, a similarity value between the last assistance scene and the current assistance scene based on the feature values of the one or more index items; and
specifying an operator whose the similarity value is equal to or greater than a predetermined threshold as the one or more candidate operators.

4. The remote assistance system according to claim 1, wherein
specifying the one or more candidate operators further includes adding an operator whose the last assistance scene is not managed in the database to the one or more candidate operators.

5. A remote assistance method for providing, by a computer, a remote assistance function of a vehicle by a plurality of operators, the remote assistance method including:
managing, for each of the plurality of operators, feature values of a plurality of feature items regarding a last assistance scene that is a target scene in a last processed remote assistance request;
when a new assistance request is received from the vehicle, specifying one or more index items from the plurality of feature items as indicators for similarity determination between the last assistance scene and a current assistance scene that is a target scene in the new assistance request;
specifying, from the plurality of operators, one or more candidate operators whose the last assistance scene is similar to the current assistance scene based on the feature values of the one or more index items; and
selecting an operator to process the new assistance request from the one or more candidate operators.

* * * * *